United States Patent

Carr et al.

[11] Patent Number: 5,898,476
[45] Date of Patent: Apr. 27, 1999

[54] DATA FORMAT FOR MAGNETICALLY COATED FILM

[75] Inventors: Thomas D. Carr, Leucadia, Calif.; How J. Tsao; Peter J. Mojsej, both of Rochester, N.Y.

[73] Assignee: Eastman Kodak Company, Rochester, N.Y.

[21] Appl. No.: 08/781,763

[22] Filed: Jan. 10, 1997

[51] Int. Cl.⁶ .......................... G03B 27/32; G03B 27/52
[52] U.S. Cl. ...................... 355/40; 355/39; 355/41; 355/42
[58] Field of Search ..................... 355/39, 40, 41, 355/42

[56] References Cited

U.S. PATENT DOCUMENTS

| | | |
|---|---|---|
| 4,965,627 | 10/1990 | Robison ................................. 355/40 |
| 5,130,745 | 7/1992 | Cloutier et al. . |
| 5,231,451 | 7/1993 | Uekusa et al. ........................ 355/29 |
| 5,729,328 | 3/1998 | Kimura et al. ....................... 355/40 |
| 5,729,329 | 3/1998 | Ajimu et al. ......................... 355/40 |

*Primary Examiner*—Richard Moses
*Assistant Examiner*—Shival Virmani
*Attorney, Agent, or Firm*—William F. Noval

[57] ABSTRACT

In a photographic film having a substantially transparent magnetic layer, and a sequence of longitudinally spaced image frames, the improvement comprising:

at least one longitudinal magnetic track in said magnetic layer located on a side of each image frame, said track having a fixed length L; and a pair of data blocks recorded on said track, each said data block having a length which is less than L/2 and being recorded respectively at the beginning and end of said track with an unrecorded space between said data blocks.

2 Claims, 2 Drawing Sheets

DATA FORMAT FOR MAGNETICALLY COATED FILM

FIELD OF THE INVENTION

This invention relates in general to photographic systems and relates more particularly to a data format for magnetically coated film.

BACKGROUND OF THE INVENTION

The recent announcement of the Advanced Photography System (APS) has brought a new era to photography. The system centers around a photographic film having a substantially transparent magnetic layer on the non-emulsion side of the film (referred to as the MOF layer). One or more longitudinal read/write tracks are provided in the MOF layer between the side edges of the image frame area and the film. Information such as film type, film speed, film exposure information, and information relevant to the processing and subsequent use (e.g., printing) of the exposed image frames may be prerecorded during production of the film cartridge. The prerecorded information useful for controlling camera operations can be read out in a camera and information related to exposure of an image frame can be recorded during camera use. Voice messages and/or sound associated with the photographed scene can also be recorded during camera use.

In the Advanced Photo System, the information is magnetically recorded on film in a standardized format that has been agreed to globally by the film and camera manufacturers. (See, for example, U.S. Pat. No. 5,130,745, issued Jul. 14, 1992, inventors Cloutier et al.).This format is illustrated in FIG. 1. Film 10 has a series of perforations 12 along one edge only. A first set of longitudinal magnetic tracks 14 and 16 are located between the perforations 12 on one side of image frames 18. A second set of longitudinal magnetic tracks 20 and 22 are located on the other side of frames 18 running along the unperforated edge of film 10.

The magnetically recorded tracks in the APS format are fixed in length and are relatively low in data density. Systems for storing and retrieving information from a physical medium, such as magnetic tape, must take steps to insure that the process can be done reliably. Often, physical defects in the medium, dust and dirt on the medium, or contamination from the medium can interfere with the storage or retrieval process. When this happens, long strings of data, called bursts, can be lost. Typically, powerful error correction codes and data interleaving are employed to correct for any error bursts that might occur. There are some magnetic data systems, however, such as the magnetically coated film systems described above, that cannot employ these methods, due to cost restrictions or small quantities of recorded data.

In the magnetically coated film system described above, the data tracks are of a fixed length. Current techniques for minimizing error problems in such systems are shown in FIGS. 2a–2c. Each of the shown techniques employ multiple recordings of the same data in a frame to achieve reliability in data recovery. FIG. 2a shows recording the same data three times within the fixed length of a track 28 of length L. Thus, data block 30 includes a preamble 32, data 34, and postamble 36. Each data block 30 has a length L/3. With such a format, for the data to be unrecoverable, all three recordings of the data would have to be corrupted, either by a single burst error extending through all three recording, two burst errors corrupting different segments of the three recordings, or three burst errors corrupting the three recordings.

FIG. 2b shows recording the data block 40 two times over the full length L of track 28'. Each data block 40 has a length L/2. This format has the very desirable feature of allowing substantially more data to be recorded in a track. However, a single short burst error that occurs in the middle of the track, could corrupt both of the data blocks, rendering the data set substantially unrecoverable. FIG. 2c shows recording a shorter data block 50 consecutively twice at the beginning of the fixed length track 28" leaving a space 52 at the end of the track. This format does little to reduce errors, since a single error burst that occurs bridging the data blocks 50 will corrupt the data set.

SUMMARY OF THE INVENTION

According to the present invention there is provided a solution to the problems discussed above.

According to a feature of the present invention there is provided in a photographic film having a substantially transparent magnetic layer, and a sequence of longitudinally spaced image frames, the improvement comprising:

at least one longitudinal magnetic track in said magnetic layer located on a side of each image frame, said track having a fixed length L; and a pair of data blocks recorded on said track, each said data block having a length which is less than L/2 and being recorded respectively at the beginning and end of said track with an unrecorded erased, or independent, indiscernible data space between said data blocks.

Advantageous Effect

The present invention has the following advantages, among others.

1. Data recorded in a magnetic track of magnetically coated film would require a much longer error burst to corrupt both recordings than in known film data formats.

2. The probability of the occurrence of a corrupting error burst as in 1, is smaller.

DESCRIPTION OF THE PREFERRED EMBODIMENTS

Figure 1:
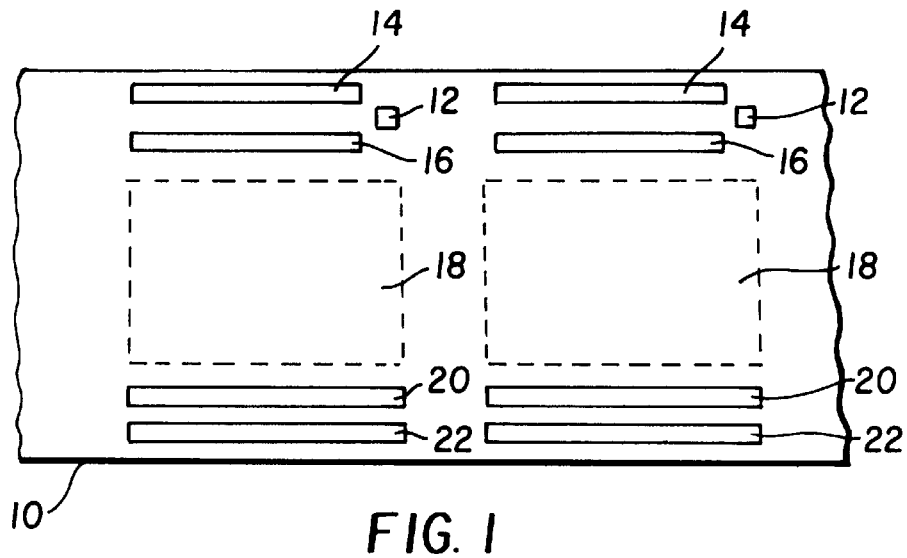
FIG. 1 is a diagrammatic view of standard format APS film.
Figure 3:
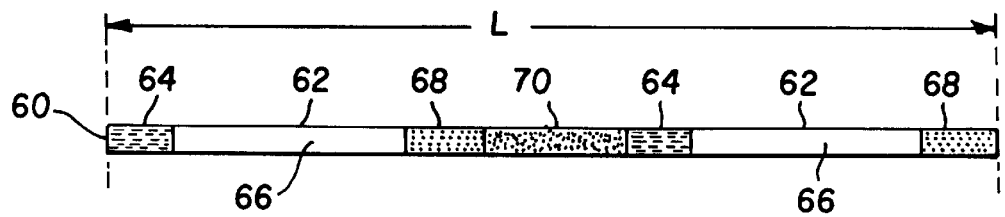
FIG. 3 is a diagrammatic view of a film data block error minimizing format according to the present invention.

Referring now to FIG. 3, there is diagrammatically shown a preferred embodiment of the present invention. As shown, magnetic track 60 of fixed length L is provided on magnetically coated photographic film, such as shown in FIG. 1. Track 60, for example, can be any of tracks 14, 16, 20, 22 on film 10 of FIG. 1. Track 60 can also be located on any magnetically coated photosensitive media, such as x-ray film, 35 mm film, or the like.

Figure 2A:
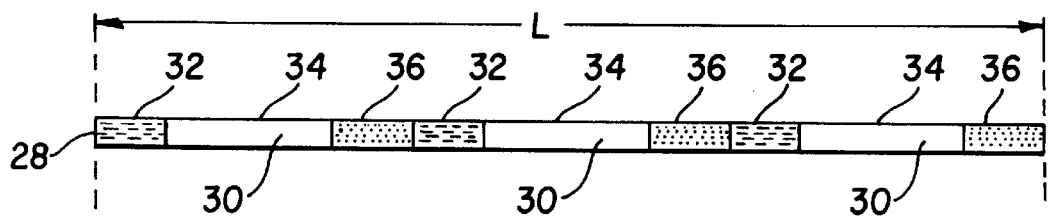
FIGS. 2a–2c are diagrammatic views of known film data block error minimizing formats.
Figure 2B:
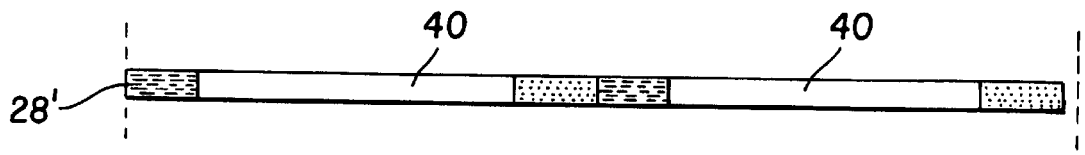
Figure 2C:
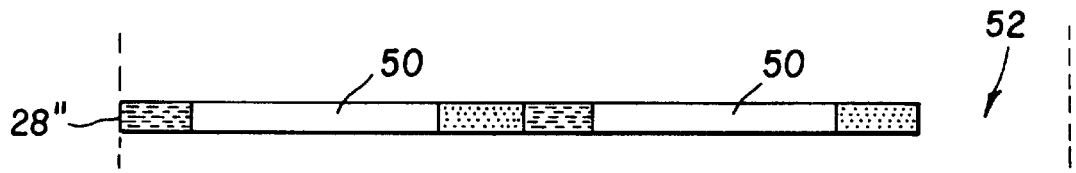

Track 60 has recorded thereon two identical data blocks 62 including preamble 64, data 66, and postamble 68. The length of each data block 62 is less than L/2. One data block 62 is recorded at the beginning of track 60 and the other data block 62 is recorded at the end of track 60. The data blocks 62 are spaced apart by an unrecorded erased, or independent, indiscernible data section 70 of track 60. The advantage of this data format over the data formats shown in FIGS. 2a–2c is that a much longer error burst is required to corrupt both recordings in FIG. 3 than in the formats of FIG. 2b and FIG. 2c. Since the burst must be longer, the probability of its recurring is smaller. The advantage over the format of FIG. 2a is that only two data repetitions are recorded in each track, allowing for more data to be recorded in each data block.

Figure 4:
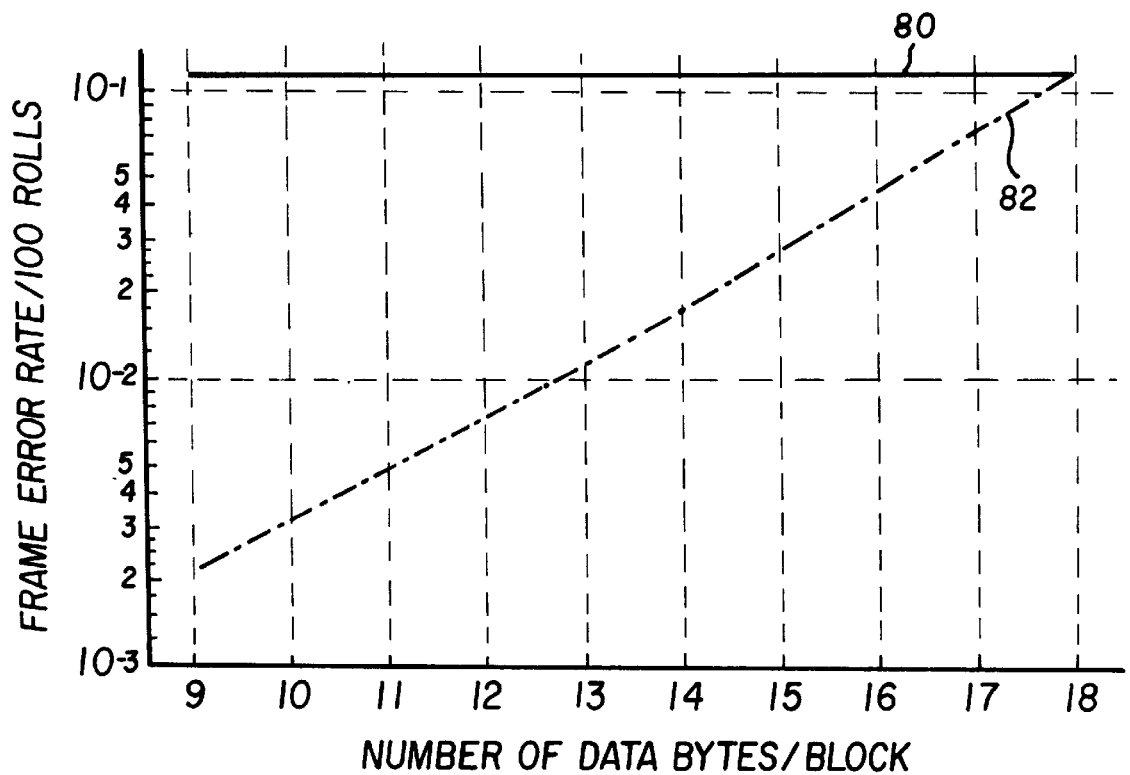
FIG. 4 is a graphical view illustrating the advantages of the present invention.

FIG. 4 shows an example of the reduction in error rate using the present invention. As shown, the black line plot 80 represents the error rate for successive block writing, while the chain link plot 82 represents the error rate for spaced block writing according to the present invention. As the number of data bytes within a block decreases, the error rate improves.

It will be appreciated by those skilled in the art that the present invention is applicable to other films having a magnetic layer, such as radiographic film, 35 mm film, etc. In such cases, the data block format is as shown in FIG. 3.

While the invention has been described in detail by specific reference to preferred embodiments thereof, it is understood that other variations and modifications may be made without departing from the spirit and scope of the invention.

| Parts List | |
|---|---|
| 10 | film |
| 12 | perforation |
| 14,16 | magnetic track |
| 18,18' | image frame |
| 20,22 | magnetic track |
| 28,28',28'',60 | magnetic track |
| 30,40,50,62 | data block |
| 32,64 | preamble |
| 34,66 | data |
| 36,68 | postamble |
| 52,70 | data gap |
| 80,82 | plot |

What is claimed is:

1. In a photographic film having a substantially transparent magnetic layer, and a sequence of longitudinally spaced image frames, the improvement comprising:

at least one longitudinal magnetic track in said magnetic layer located on a side of each image frame, said track having a fixed length L which is equal to or less than the length of said image frame and is coextensive with said frame; and a pair of data blocks recorded on said track, each said data block having a length which is less than L/2 and being recorded respectively at the beginning and end of said track with an unrecorded space between said data blocks.

2. In a photosensitive media having a substantially transparent magnetic layer and a sequence of longitudinally spaced image frames, the improvement comprising:

at least one magnetic track in said magnetic layer, said track having a fixed length L which is equal to or less than the length of an image frame and is coextensive with said frame; and a pair of data blocks recorded on said track, each said data block having a length which is less than L/2 and being recorded respectively at the beginning and end of said track with an unrecorded space between said data blocks.

* * * * *